(12) United States Patent
Lin et al.

(10) Patent No.: US 8,134,332 B2
(45) Date of Patent: Mar. 13, 2012

(54) PORTABLE SOLAR CELL CHARGING DEVICE

(75) Inventors: Kuo-Len Lin, Wugu Township, Taipei County (TW); Chen-Hsiang Lin, Wugu Township, Taipei County (TW); Hwai-Ming Wang, Wugu Township, Taipei County (TW); Ken Hsu, Wugu Township, Taipei County (TW); Chih-Hung Cheng, Wugu Township, Taipei County (TW)

(73) Assignees: CPUMate Inc., Taipei County (TW); Golden Sun News Techniques Co., Ltd., Taipei County (TW)

( * ) Notice: Subject to any disclaimer, the term of this patent is extended or adjusted under 35 U.S.C. 154(b) by 721 days.

(21) Appl. No.: 12/277,377

(22) Filed: Nov. 25, 2008

(65) Prior Publication Data

US 2010/0127657 A1 May 27, 2010

(51) Int. Cl.
*H02J 7/00* (2006.01)
(52) U.S. Cl. ........................ 320/101; 320/113
(58) Field of Classification Search .................. 320/101, 320/110, 113
See application file for complete search history.

(56) References Cited

U.S. PATENT DOCUMENTS

| | | | | |
|---|---|---|---|---|
| 6,326,764 B1 * | 12/2001 | Virtudes | | 320/101 |
| 6,977,479 B2 * | 12/2005 | Hsu | | 320/101 |
| 7,893,657 B2 * | 2/2011 | Chavakula | | 320/138 |
| 2007/0216346 A1 * | 9/2007 | Lu | | 320/101 |
| 2009/0021209 A1 * | 1/2009 | Lin | | 320/101 |

* cited by examiner

*Primary Examiner* — Edward Tso
*Assistant Examiner* — Ramy Ramadan
(74) *Attorney, Agent, or Firm* — Chun-Ming Shih; HDLS IPR Services

(57) ABSTRACT

A solar cell charging device includes a base shown as a shell shape, a light-converging lens arranged at a top face of the base, a solar collector correspondingly located under the light-converging lens and a photoelectric converting unit. A plurality of charging troughs arranged on the base are recessed inwardly from circumferential faces thereof. The photoelectric converting unit is connected between each charging trough and the solar collector, converting the light energy absorbed by the solar collector into electric energy provided to be input into each charging trough, after the light-converging lens focuses the solar energy onto the solar collector.

10 Claims, 4 Drawing Sheets

PORTABLE SOLAR CELL CHARGING DEVICE

BACKGROUND OF THE INVENTION

1. Field of the Invention

The present invention in general relates to a cell charging device, in particular, to a portable cell charging device powered by solar energy.

2. Description of Prior Art

Accordingly, since of a growing popularity of 3C product, many electronic devices such as cellular phone, digital camera, electronic dictionary, MP3 and PDA are all portable, so an interchangeable built-in cell becomes a prerequisite. However, in order to avoid the environmental problem arisen from the use of dry cell, the aforementioned products are usually provided a chargeable cell that is reusable.

However, although the provided cell is chargeable, many users still have to charge the cell fully before it is taken outdoors. As soon as the electric power of the cell is exhausted, a spare cell has to be additionally provided, or a charging device has to be at hand. As a general rule, although spare cells are convenient, for a user in a long trip or traveling abroad, carrying a huge number of spare cells is still a bothering problem. Therefore, a portable charger or a charging device becomes a preferable option to solve such kind of problem and inconvenience. In the meantime, in order to provide the charger or charging device with handily power-supplying source, a charger capable of converting solar energy into electric energy is thus emerging in today's market.

However, on one hand, the solar charger according to the prior arts has a poor efficiency in absorbing solar energy, because it only uses solar plate to collect light energy directly. On the other hand, when the carried charger only with one specification or model, it is impossible to provide enough charging function to many cells that are used by the all carried along 3C products, so the user still has to face the inconvenience of carrying many kinds of charging devices.

After a substantially devoted study, in cooperation with the application of relatively academic principles, the inventor has finally proposed the present invention that is designed reasonably to possess the capability to improve the prior arts significantly.

SUMMARY OF THE INVENTION

The invention is mainly to provide a portable solar cell charging device, in which a light-converging lens is further assembled on a solar collector thereof, such that the efficiency of absorbing solar energy is promoted, because the sun light coming from the surrounding can be collected more effectively.

Secondly, the invention is to provide a portable solar cell charging device, which applies a special design and a disposing relationship by arranging a plurality of inserting troughs around the surrounding of the cell charging device, making the cell charging device capable of simultaneously providing a plurality of charging troughs, which are applicable to process a charging function to a plurality of cells with different specifications and models at the same time.

Finally, the invention is also to provide a portable solar cell charging device, which includes a base shown as a shell shape, a light-converging lens arranged at a top face of the base, a solar collector correspondingly located under the light-converging lens and a photoelectric converting unit. In the invention, a plurality of charging troughs that are arranged on the base are recessed inwardly from the circumferential faces thereof. The photoelectric converting unit is connected between each charging trough and the solar collector, converting the light energy absorbed by the solar collector into electric energy provided to be input into each charging trough, after the light-converging lens concentrates the solar energy onto the solar collector. Thereby, the cell charging device according to the present invention is thus obtained to fulfill the aforementioned objectives.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE INVENTION

In cooperation with attached drawings, the technical contents and detailed description of the present invention are described thereinafter according to a number of preferable embodiments, not used to limit its executing scope. Any equivalent variation and modification made according to appended claims is all covered by the claims claimed by the present invention.

Figure 1:
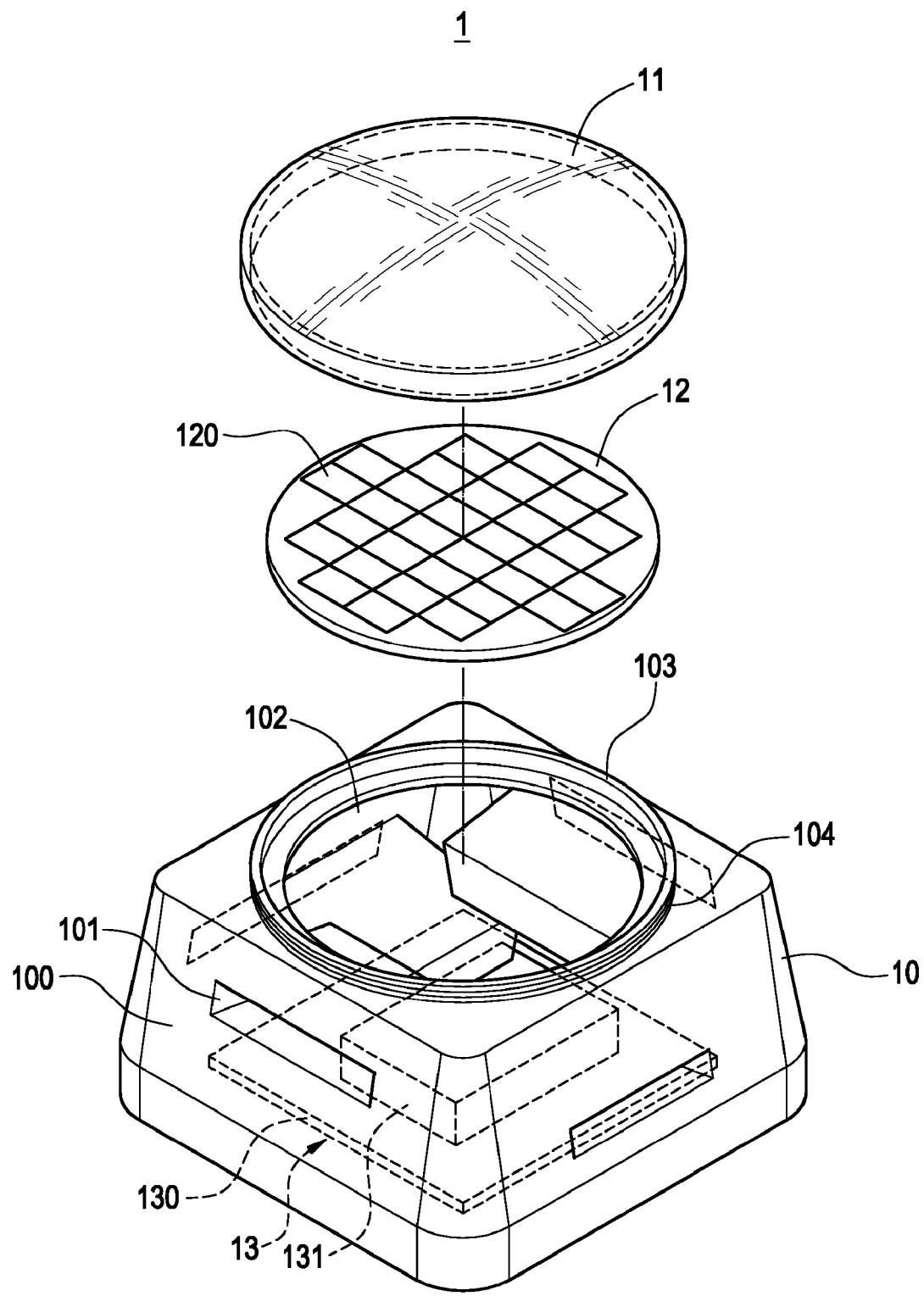
FIG. 1 is a perspective explosive illustration of the invention.
Figure 2:
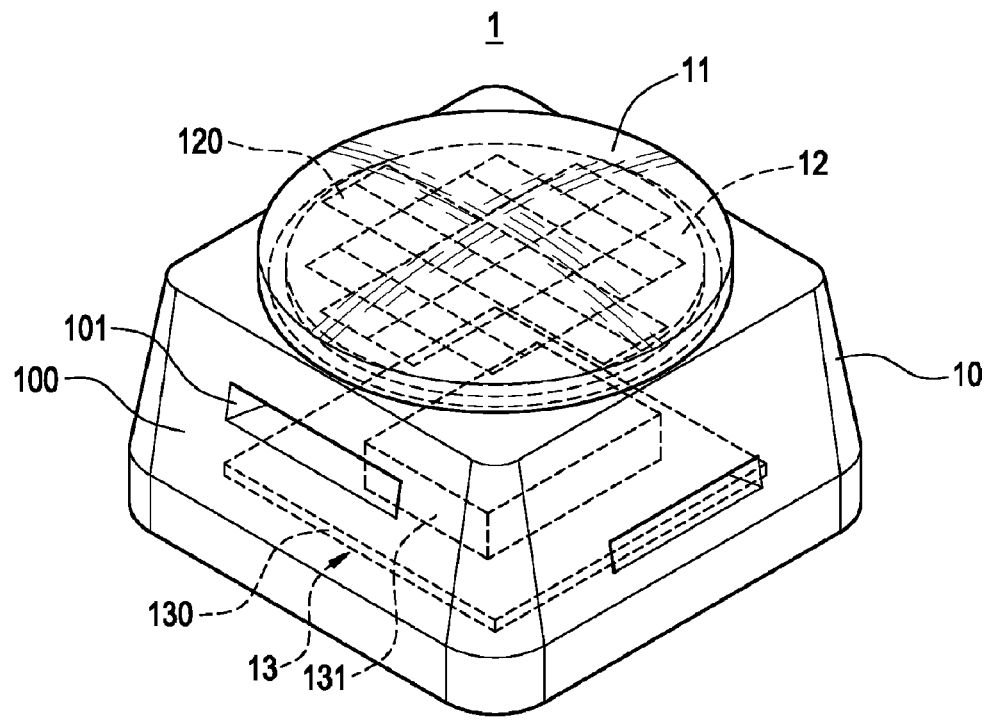
FIG. 2 is a perspective assembled illustration of the invention.

Please refer to FIG. 1 through FIG. 2, which respectively are a perspective explosive illustration and a perspective assembled illustration of the invention. The invention is to provide a portable solar cell charging device, including a base 10, a light-converging lens 11, a solar collector 12 and a photoelectric converting unit 13.

According to a preferable embodiment of the invention, the base 10 is a hollow shell for supporting the aforementioned assemblies to constitute a portable charging seat. The cross section of the base 10 is a circle or a polygon. In the preferable embodiment of the invention, the cross section of the base 10 is a quadrilateral. In the lateral directions of the base 10, there are four circumferential faces 100 that are interconnected. On each circumferential face 100, there is a charging trough 101 that is recessed inwardly. The charging troughs 101 can also be disposed on the circumferential faces 100 with different altitudes, such that the internal space of the base 10 can be utilized effectively, avoiding the plural charging troughs 101 from occupying too much space.

The light-converging lens 11 that is a convex lens showing as a circular mirror is arranged at a top face of the base 10. The circular convex lens can concentrate the light energy by focusing the sun light from the surrounding. In a preferable embodiment of the invention, an opening 102 is arranged at a top face of the base 10 at a position corresponding to the light-converging lens 11. Furthermore, a ring net 103, around which there are threads, is arranged and projected at a circumference of the opening 102 for fastening the light-converging lens 11 by a screwed manner.

The solar collector 12, constituted by a plurality of solar chips 120, is arranged at the base 10 corresponding to an under position of the light-converging lens 11 for receiving the sun light focused by the light-converging lens 11. In a preferable embodiment of the invention, since the solar collector 12 is laid within the opening 102 of the base 10, which just corresponds to the under position of the light-converging lens 11, the solar collector 12 is covered by the light-converging lens 11 and is located therein.

The photoelectric converting unit 13 includes a control circuit board 130 and a battery 131 arranged on the control circuit board 130. The photoelectric converting unit 13, arranged in the base 10, is electrically connected between each charging trough 101 and the solar collector 12 for converting the solar energy absorbed by the solar collector 12 into electric energy that is then provided to each charging trough 101, through which the electric energy can be input to undergo an electrically charging process to the cell to be charged 2 (as shown in FIG. 3).

Thereby, through the structural constitution mentioned hereinbefore, a portable solar cell charging device according to the invention is thereby obtained.

Figure 3:
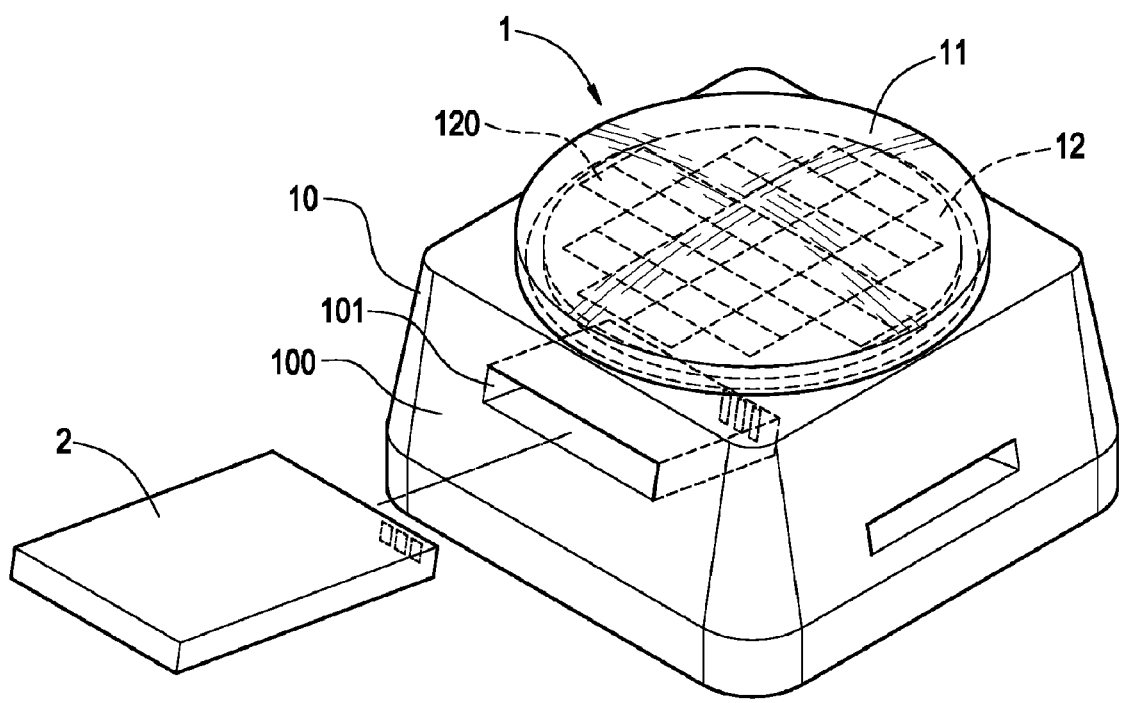
FIG. 3 is an illustration showing the invention to be inserted by a single cell to be charged therein.
Figure 4:
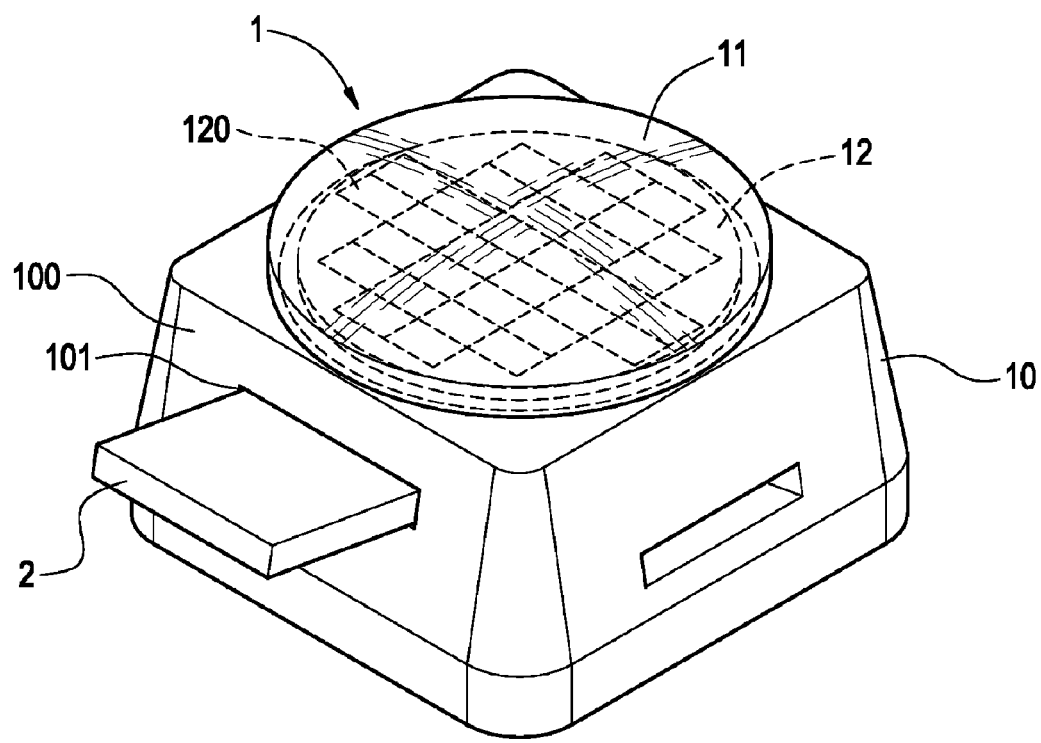
FIG. 4 is an illustration showing the invention that has been inserted by a single cell charged therein.
Figure 5:
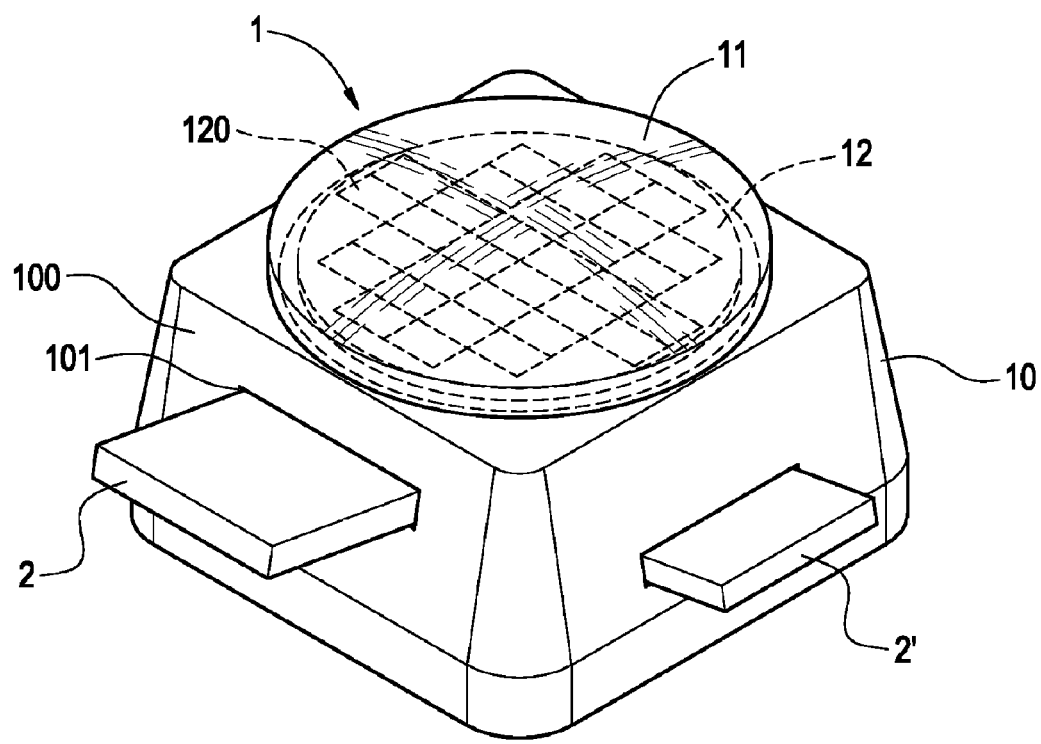
FIG. 5 is an illustration showing the invention that has been inserted by a plurality of cells charged therein.

Accordingly, as shown in FIG. 3 and FIG. 4, since the light-converging lens 11 is disposed on the solar collector 12 of the cell charging device 1, so the sun light from the surrounding can be concentrated on the solar collector 12 by passing through the light-converging lens 11. Thereby, the sun light from the surrounding can be concentrated effectively to promote the absorbing efficiency of solar energy. In the meantime, since the cell charging device 1 is to provide the four circumferential faces 100 of the base 10 respectively for the disposition of each charging trough 101, making the charging troughs 101 of each circumferential faces 100 positioned at different altitudes to form an integral design effectively utilizing the internal space of the base 10 and gain a benefit of less space occupation. In particular, since the provision of the plural charging troughs 101, a plurality of cells to be charged 2, 2' that have different specifications and models can be charged correspondingly and simultaneously, as shown in FIG. 5.

Figure 6:
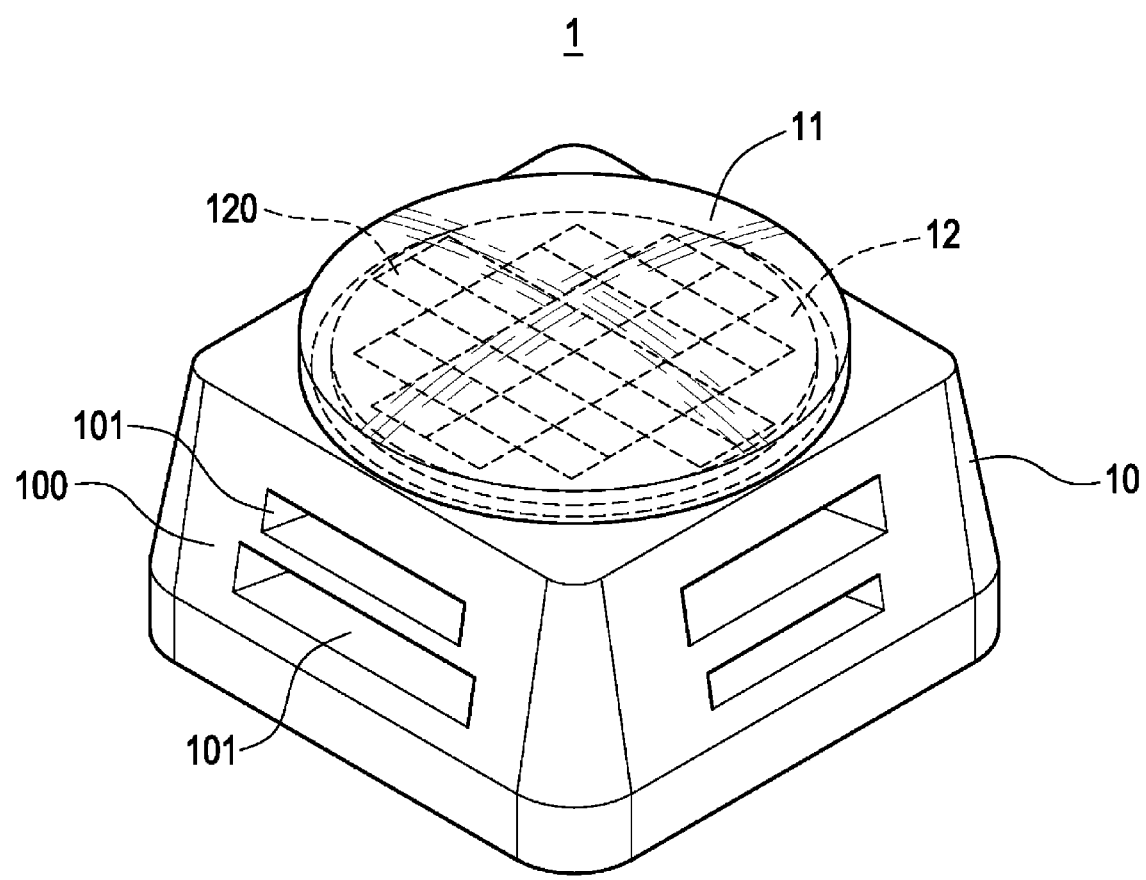
FIG. 6 is a perspective assembled illustration of another embodiment of the invention.

In addition, as shown in FIG. 6, a plurality of charging troughs 101 can be further arranged at each circumferential face 100 of the base 10 of the cell charging device 1, so the disposing number of the charging troughs 101 can be designed according to the practical need.

Therefore, through a portable solar cell charging device of the invention, not only the efficiency of absorbing solar energy is promoted, but also the inconvenience of carrying a lot of chargers corresponding to different specifications and models of the plural portable electronic products can be avoided, when the user goes outdoors.

Summarizing aforementioned description, the invention is an indispensably novel structure for a compressor indeed, which may positively reach the expected usage objective for solving the drawbacks of the prior arts, and which extremely possesses the innovation and progressiveness to completely fulfill the applying merits of new type patent, according to which the invention is thereby applied. Please examine the application carefully and grant it as a formal patent for protecting the rights of the inventor.

However, the aforementioned description is only a preferable embodiment according to the present invention, being not used to limit the patent scope of the invention, so equivalently structural variation made to the contents of the present invention, for example, description and drawings, is all covered by the claims claimed thereinafter.

What is claimed is:

1. A portable solar cell charging device, including:
    a base, which is a shell, and at lateral directions of which there are circumferential faces interconnected to each other, having a plurality of charging troughs recessed inwardly from the circumferential faces, wherein each charging trough is configured to hold and charge a battery;
    a light-converging lens, which is arranged at a top face of the base;
    a solar collector, which is arranged on the base and is located at an under position of the light-converging lens correspondingly; and
    a photoelectric converting unit, which is connected between each charging trough and the solar collector for converting a light energy absorbed by the solar collector into an electric energy to be input into each charging trough.

2. The portable solar cell charging device according to claim 1, wherein the connected circumferential face of the base is shown as a circular shape.

3. The portable solar cell charging device according to claim 1, wherein the connected circumferential face of the base is a polygon.

4. The portable solar cell charging device according to claim 3, wherein the polygon is a quadrilateral.

5. The portable solar cell charging device according to claim 1, wherein the charging troughs are disposed on the circumferential faces with different altitudes.

6. The portable solar cell charging device according to claim 1, wherein a top face of the base is arranged an opening, around a circumference of which a ring net with threads is arranged and projected, around which the light-converging lens is screwed.

7. The portable solar cell charging device according to claim 6, wherein the solar collector is laid within the opening.

8. The portable solar cell charging device according to claim 1, wherein the light-converging lens is a convex lens.

9. The portable solar cell charging device according to claim 1, wherein the solar collector is constituted by a plurality of solar chips.

10. The portable solar cell charging device according to claim 1, wherein the photoelectric converting unit includes a control circuit board and a battery arranged on the control circuit board.

\* \* \* \* \*